(12) United States Patent
Chang

(10) Patent No.: US 9,952,359 B2
(45) Date of Patent: Apr. 24, 2018

(54) IMAGING LENS MODULE AND ELECTRONIC DEVICE

(71) Applicant: LARGAN PRECISION CO., LTD., Taichung (TW)

(72) Inventor: Cheng-Chung Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/051,764

(22) Filed: Feb. 24, 2016

(65) Prior Publication Data

US 2017/0176649 A1 Jun. 22, 2017

(30) Foreign Application Priority Data

Dec. 17, 2015 (TW) .............................. 104220292 U

(51) Int. Cl.
| | | |
|---|---|---|
| *G02B 3/02* | (2006.01) | |
| *G02B 25/00* | (2006.01) | |
| *G02B 9/00* | (2006.01) | |
| *G02B 5/00* | (2006.01) | |
| *G02B 9/34* | (2006.01) | |
| *G02B 9/62* | (2006.01) | |
| *G02B 13/00* | (2006.01) | |

(Continued)

(52) U.S. Cl.
CPC ............... *G02B 5/003* (2013.01); *G02B 9/34* (2013.01); *G02B 9/62* (2013.01); *G02B 13/004* (2013.01); *G02B 13/0045* (2013.01); *G02B 27/0025* (2013.01); *G02B 1/041* (2013.01)

(58) Field of Classification Search
CPC .......... G02B 13/18; G02B 9/34; G02B 5/005; G02B 13/00; G02B 5/0278; G02B 21/24; G02B 5/045; G02B 27/0018; G02B 3/00; G02B 25/001; G02B 7/02; G02B 7/021; B60R 1/12; B60R 1/088; B60R 1/086; B60R 1/085; B60R 1/084; H04N 5/65; G03B 11/04

USPC ........ 359/708, 713–716, 738–740, 601–614, 359/642–645

See application file for complete search history.

(56) References Cited

U.S. PATENT DOCUMENTS

| | | |
|---|---|---|
| 6,819,508 B2 | 11/2004 | Chiang |
| 7,391,457 B2 | 6/2008 | Fujimoto et al. |

(Continued)

FOREIGN PATENT DOCUMENTS

CN 203759336 U 8/2014

*Primary Examiner* — Dawayne A Pinkney
(74) *Attorney, Agent, or Firm* — McClure, Qualey & Rodack, LLP

(57) ABSTRACT

An imaging lens module includes a plurality of lens elements, wherein one of the lens elements is a plastic lens element. At least one surface of an object-side surface and an image-side surface of the plastic lens element includes an effective optical portion, a first fitting portion and a connecting portion. The effective optical portion is aspheric. The first fitting portion surrounds the effective optical portion and is connected to another one of the lens elements adjacent to the surface for aligning the plastic lens element with the lens element adjacent to the surface. The connecting portion connects the effective optical portion and the first fitting portion, and includes a coating area and an isolation area. The coating area is coated with a light absorbing coating. The isolation area connects the coating area and the first fitting portion.

16 Claims, 12 Drawing Sheets

(51) Int. Cl.
*G02B 27/00* (2006.01)
*G02B 1/04* (2006.01)

(56) References Cited

U.S. PATENT DOCUMENTS

| | | |
|---|---|---|
| 7,545,583 B2 | 6/2009 | Hayashi et al. |
| 8,031,412 B2 | 10/2011 | Shintani |
| 8,102,609 B2 | 1/2012 | Tsuchiya et al. |
| 8,736,989 B2 | 5/2014 | Wu |
| 8,842,376 B2 | 9/2014 | Yang et al. |
| 2001/0008468 A1* | 7/2001 | Togashi ............... G02B 27/58 359/642 |
| 2012/0162795 A1* | 6/2012 | Yoshimura ............ G02B 7/022 359/830 |
| 2014/0078606 A1* | 3/2014 | Wu ....................... G02B 7/025 359/827 |
| 2015/0103407 A1 | 4/2015 | Chen |
| 2015/0226931 A1 | 8/2015 | Huang |

* cited by examiner

IMAGING LENS MODULE AND ELECTRONIC DEVICE

RELATED APPLICATIONS

This application claims priority to Taiwan Application Serial Number 104220292, filed on Dec. 17, 2015, which is herein incorporated by reference.

BACKGROUND

Technical Field

The present disclosure relates to an imaging lens module. More particularly, the present disclosure relates to an imaging lens module which is applicable to portable electronic devices.

Description of Related Art

Due to the popularity of personal electronic products and mobile communication products having camera functionalities, such as smart phones and tablet personal computers, the demand for compact imaging lens modules has been increasing and the requirements for high resolution and image quality of present compact imaging lens modules increase significantly.

The compact imaging lens module typically includes a plurality of plastic lens elements so as to enhance the image quality by the plastic lens elements featured with compact sizes, aspheric surfaces and sharp changing of curvatures. However, lens elements with compact sizes and aspheric surfaces often result in aligning problems among lens elements. To solve the problems, the technology of lens elements with the inserting structures has been developed to improve the precision of axial installation. But the complexity of the inserting structures increases the difficulties of stray light control and it becomes worse when the imaging lens modules have compact sizes.

For suppressing the stray light of the imaging lens modules, one of the conventional methods is applying ink on the lens elements. That is placing a lens element on a turntable, applying the ink on the edge of the lens element by a brush and drying the ink by air or heating. However, the method could not be applied in the plastic lens elements with compact sizes and high accuracy due to the variation of ink applying exceeds the scale of the lens elements. On the other hand, removing the excess ink by wiping is also difficult for the lens elements. To solve the problem, the technology of the optical refractive index matching layer configured in a gap between the black barrel and the lens element has been developed in order to reduce the reflection in the edge of the lens element, but there are many limitations to configure the optical refractive index matching layer.

Given the above, how to simultaneously meet the requirements of aligning with the optical axis of the lens elements and suppressing the stray light of the compact imaging lens module has become one of the important subjects, so that the image quality of the compact imaging lens modules can be enhanced, and the requirements of high-end optical systems with camera functionalities can be satisfied.

SUMMARY

According to one aspect of the present disclosure, an imaging lens module includes a plurality of lens elements, wherein one of the lens elements is a plastic lens element. At least one surface of an object-side surface and an image-side surface of the plastic lens element includes an effective optical portion, a first fitting portion and a connecting portion. The effective optical portion is aspheric. The first fitting portion surrounds the effective optical portion and is connected to another one of the lens elements adjacent to the surface for aligning the plastic lens element with the lens element adjacent to the surface. The connecting portion connects the effective optical portion and the first fitting portion, and includes a coating area and an isolation area. The coating area is coated with a light absorbing coating. The isolation area isolates the coating area from the first fitting portion. When a number of the lens elements of the imaging lens module is N, the following condition is satisfied: N>3.

According to another aspect of the present disclosure, an electronic device includes an imaging lens module according to the foregoing aspect.

DETAILED DESCRIPTION

1st Embodiment

Figure 1A:
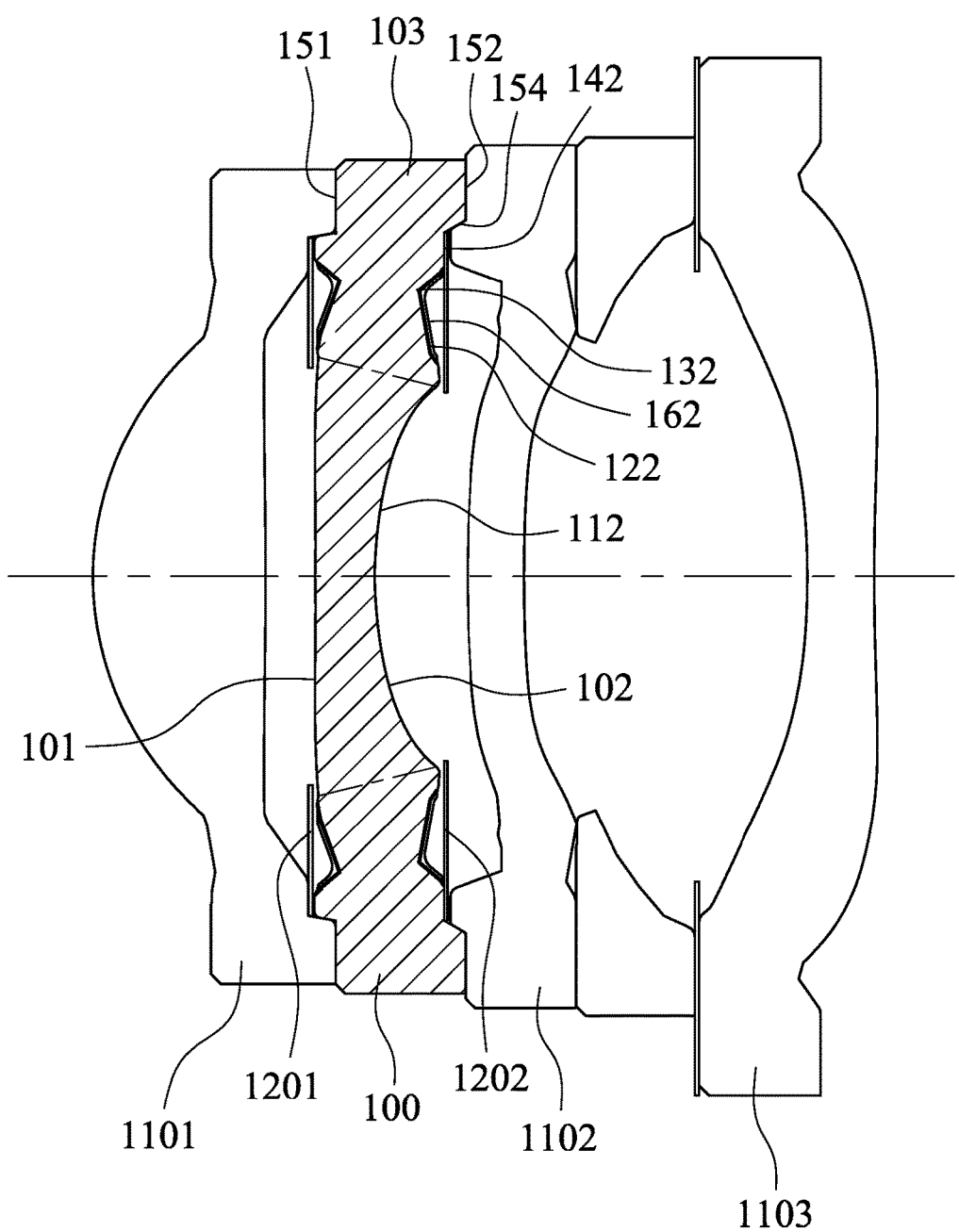
FIG. 1A is a schematic view of an imaging lens module according to the 1st embodiment of the present disclosure.

FIG. 1A is a schematic view of an imaging lens module 1000 according to the 1st embodiment of the present disclosure. In FIG. 1A, the imaging lens module 1000 includes a plurality of lens elements, wherein one of the lens elements is a plastic lens element 100. At least one surface of an object-side surface 101 and an image-side surface 102 of the plastic lens element 100 (the aforementioned surface is the image-side surface 102 in the 1st embodiment) includes an effective optical portion 112, a first fitting portion 152 and a connecting portion 122.

Figure 1B:
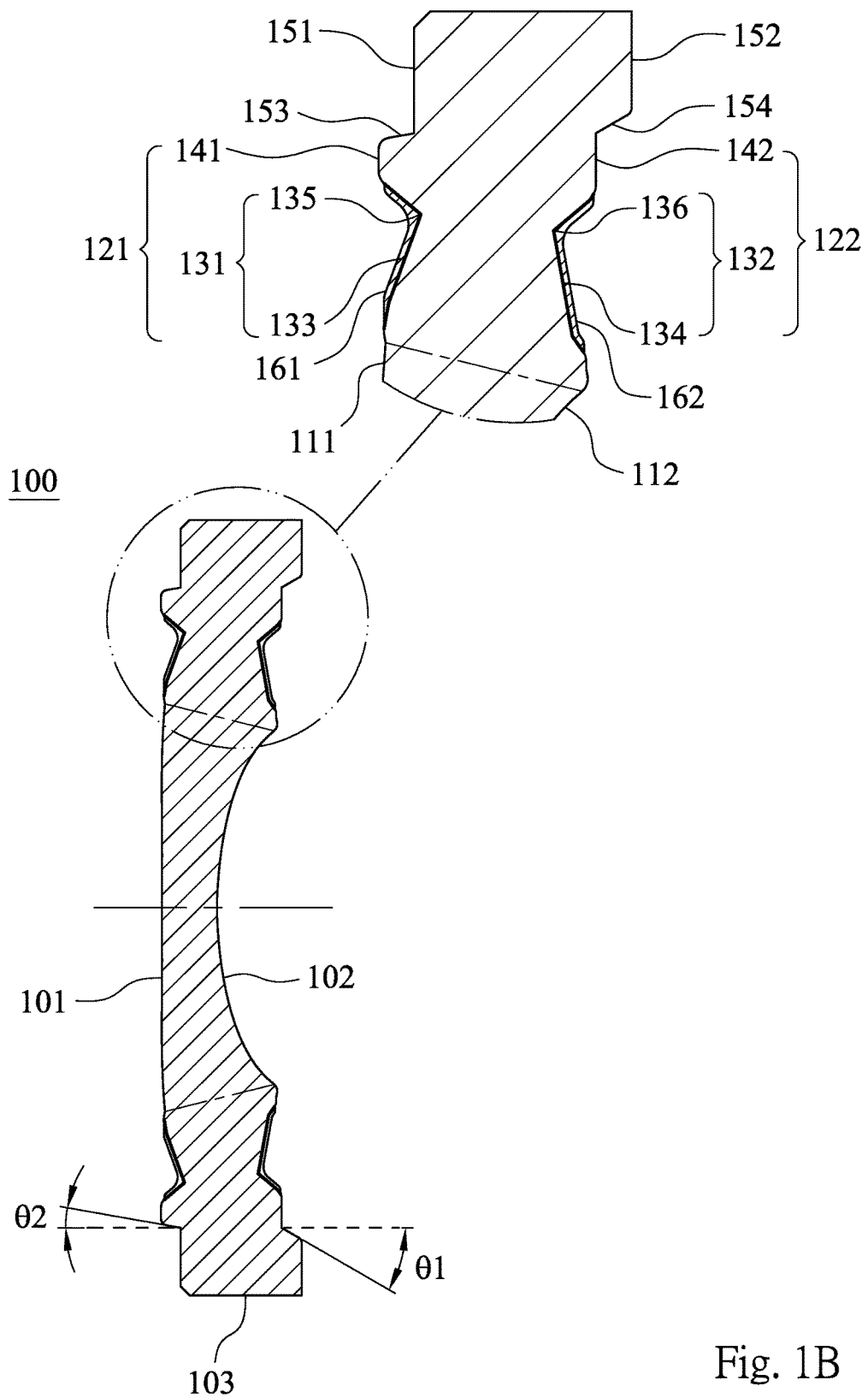
FIG. 1B is a schematic view of the plastic lens element according to the 1st embodiment.

FIG. 1B is a schematic view of the plastic lens element 100 according to the 1st embodiment. In FIG. 1B, the effective optical portion 112 is aspheric, wherein the incident light passes through the effective optical portion 112 and forms the image on an image surface (not shown herein).

In FIG. 1A and FIG. 1B, the first fitting portion 152 surrounds the effective optical portion 112 and is directly connected to a lens element 1102 adjacent to the image-side surface 102, so that the plastic lens element 100 can be aligned with the lens element 1102. That is, the plastic lens element 100 and the lens element 1102 can be aligned with an optical axis of the imaging lens module 1000.

The connecting portion 122 connects the effective optical portion 112 and the first fitting portion 152, and includes a coating area 132 and an isolation area 142. The coating area 132 is coated with a light absorbing coating 162. The isolation area 142 isolates the coating area 132 from the first fitting portion 152. Therefore, it is favorable for enhancing the aligning precision with the optical axis and suppressing the stray light of the imaging lens module 1000 simultaneously.

In FIG. 1A, when a number of the lens elements of the imaging lens module 1000 is N, the following condition is satisfied: N>3. Therefore, it is favorable for enhancing the image quality of the imaging lens module 1000 with a plurality of lens elements. Preferably, the following condition can be satisfied: N>4. In the 1st embodiment, the imaging lens module 1000 includes, in order from an object side to an image side, a lens element 1101, the plastic lens element 100, the lens element 1102 and a lens element 1103. The imaging lens module 1000 has a total of four lens elements. In other embodiments (not shown herein), the imaging lens module can have a total of five, six, seven or more lens elements. Furthermore, the imaging lens module 1000 including the plastic lens element 100 can be disposed in a barrel (not shown herein) so as to block a lot of stray light. It is favorable for avoiding the stray light entering the portions of the lens element other than the effective optical portion and preventing from unnecessary reflection among the lens elements.

In FIG. 1B, the plastic lens element 100 can be made of a transparent PC (Polycarbonate) material with a high refractive index and formed by an injection molding method so as to obtain dimensional stability. The plastic lens element 100 can be made of a PC material with a high refractive index such as SP series of Teijin or EP series of MGC (Mitsubishi Gas Chemicals). The plastic lens element 100 can also be made of a PE (Polyester resin) material such as OKP series of OGC (Osaka Gas Chemicals) or other conventional optical plastic materials. In addition, the plastic lens element 100 further includes an outer annular portion 103 connecting the object-side surface 101 and the image-side surface 102.

The light absorbing coating 162 of the coating area 132 of the connecting portion 122 can be made of a black resin material. Therefore, it is favorable for reducing the reflection of the stray light so as to enhance the image quality. In details, the material of the light absorbing coating 162 can be an oil-based paint such as a quick-drying ink with resin, epoxy resin or acrylic as a base, or a paint mixed with light-cured gel and ink particles. Due to the light absorbing coating 162 is made of resin and ink particles, the light absorbing coating 162 has flow characteristics initially.

The coating area 132 can include a rough surface 134 coated with the light absorbing coating 162. Therefore, it is favorable for the light absorbing coating 162 to be coated on the coating area 132. Furthermore, when a surface roughness of the rough surface 134 of the coating area 132 is Ra, the following condition can be satisfied: 0.1 µm<Ra. Therefore, it is favorable for the light absorbing coating 162 to be more firmly coated on the coating area 132. The coating area 132 can include an annular groove structure 136 coated with the light absorbing coating 162. Therefore, it is favorable for reducing the overflow possibility and effectively controlling the coating range of the light absorbing coating 162 so as to increase the manufacturing yield rate of the plastic lens element 100.

The isolation area 142 can be a smooth surface. Therefore, it is favorable for keeping the light absorbing coating 162 in the range of the coating area 132.

Figure 1C:
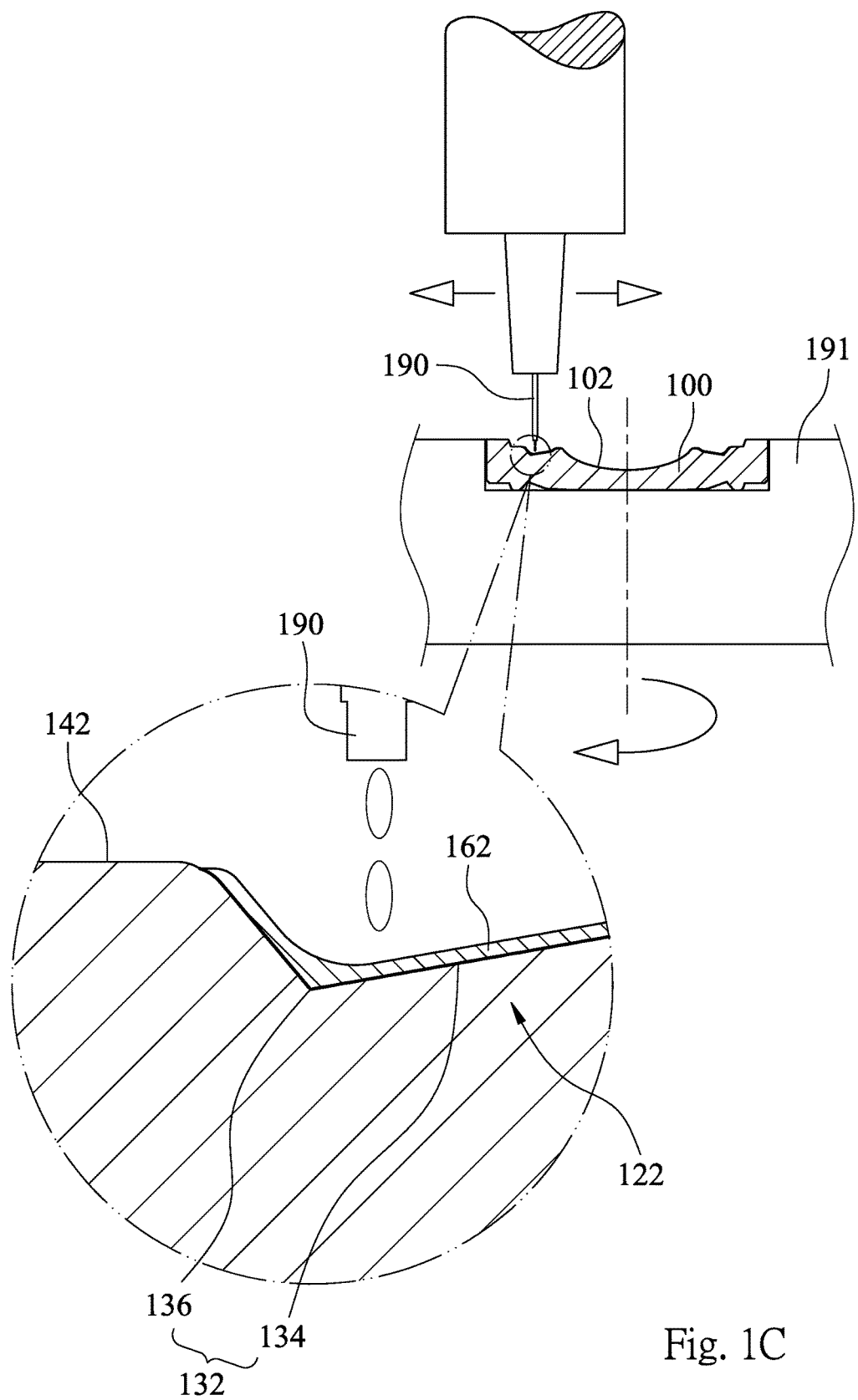
FIG. 1C is a schematic view of the light absorbing coating coated by the needle according to the 1st embodiment.

FIG. 1C is a schematic view of the light absorbing coating 162 coated by a needle 190 according to the 1st embodiment. In FIG. 1C, the light absorbing coating 162 can be coated by the needle 190. Therefore, it is favorable for effectively controlling the coating range of the light absorbing coating 162. In details, the coating area 132 includes the annular groove structure 136 having the rough surface 134. The surface roughness of the rough surface 134 coated with the light absorbing coating 162 is Ra, which is satisfied: 0.1 µm<Ra. The isolation area 142 which can be the smooth surface is disposed between the coating area 132 and the first fitting portion 152. The steps of the light absorbing coating 162 coated by the needle 190 include placing the plastic lens element 100 with the image-side surface 102 upwards on a lens element platform 191, which can be a fixture of a single lens element or an array plate of multiple lens elements for fixing the plastic lens element 100, and placing the needle 190 above the coating area 132 of the plastic lens element 100. The lens element platform 191 and the needle 190 have degrees of freedom to move or rotate relatively. In the 1st embodiment, the coating range of the light absorbing coating 162 is controlled by rotating of the lens element platform 191 and moving of the needle 190. When the flowing black resin paint is applied on the coating area 132 with the needle 190, the flowing black resin paint can spread evenly over the rough surface 134 of the coating area 132, be avoided to overflow from the coating area 132 by way of the annular groove structure 136 and stop to spread on the smooth surface of the isolation area 142. Then the light absorbing coating 162 is formed. Due to the low absorption of the smooth surface of the isolation area 142, the flowing black resin paint hardly spreads out of the rough surface 134 of the coating area 132, so that the coating range of the light absorbing coating 162 can be controlled and the first fitting portion 152 can be prevented from the light absorbing coating 162.

In FIG. 1A, the imaging lens module 1000 can further include a light blocking sheet 1202, which is disposed between the image-side surface 102 of the plastic lens element 100 and the lens element 1102 adjacent to the image-side surface 102, or between the object-side surface 101 of the plastic lens element 100 and the lens element 1101 adjacent to the object-side surface 101. Therefore, it is favorable for blocking the stray light. Furthermore, the light blocking sheet 1202 can be disposed between the image-side surface 102 with the light absorbing coating 162 and the lens element 1102. Therefore, it is favorable for further blocking the stray light. The light blocking sheet 1202 can be at least abutted with the isolation area 142 of the image-side surface 102, or at least abutted with the object-side surface 101. Therefore, it is favorable for enhancing the aligning precision with the optical axis and reducing the multiple transmission of the stray light of the imaging lens module 1000. In the 1st embodiment, the light blocking sheet 1202 is disposed between the image-side surface 102 of the plastic lens element 100 and the lens element 1102, and abutted with the isolation area 142 of the image-side surface 102.

In FIG. 1A and FIG. 1B, the first fitting portion 152 can include an inclined surface 154. When an angle between the inclined surface 154 and the optical axis of the imaging lens module 1000 is θ1, the following condition can be satisfied:

0 degrees<θ1<35 degrees. Therefore, it is favorable for the plastic lens element 100 to maintain the aligning precision with the optical axis.

In FIG. 1B, the plastic lens element 100 can have negative refractive power so as to correct the aberrations. In the 1st embodiment, the object-side surface 101 has an effective optical portion 111 being convex, and the image-side surface 102 has the effective optical portion 112 being concave. The curvature of the effective optical portion 112 is stronger than the curvature of the effective optical portion 111, so the plastic lens element 100 has negative refractive power.

When an Abbe number of the plastic lens element 100 is V, the following condition can be satisfied: V<25. Therefore, it is favorable for correcting the aberrations and the chromatic aberration of the plastic lens element 100. Preferably, the following condition can be satisfied: V<22.

In FIG. 1A, the plastic lens element 100 can be the second or the third lens element of the imaging lens module 1000 in order from the object side to the image side. Therefore, it is favorable for suppressing the stray light so as to correct the aberrations of the imaging lens module 1000. In the 1st embodiment, the plastic lens element 100 is the second lens element of the imaging lens module 1000 in order from the object side to the image side. In other embodiments (not shown herein), the plastic lens element can be the first lens element of the imaging lens module featured with a large view angle so as to correct the aberrations.

Furthermore, the other surface of the plastic lens element 100 (that is the object-side surface 101) can include a second fitting portion 151 connected to the lens element 1101 adjacent to the object-side surface 101. Therefore, it is favorable for the plastic lens element 100 to enhance the aligning precision with the optical axis.

In details, the object-side surface 101 of the plastic lens element 100 includes an effective optical portion 111, the second fitting portion 151 and a connecting portion 121. The effective optical portion 111 is aspheric. The second fitting portion 151 surrounds the effective optical portion 111 and is directly connected to the lens element 1101 adjacent to the object-side surface 101, so that the plastic lens element 100 can be aligned with the lens element 1101. That is, the plastic lens element 100 and the lens element 1101 can be aligned with the optical axis of the imaging lens module 1000. The connecting portion 121 connects the effective optical portion 111 and the second fitting portion 151, and includes a coating area 131 and an isolation area 141. The coating area 131 is coated with a light absorbing coating 161. The isolation area 141 isolates the coating area 131 from the second fitting portion 151. Therefore, it is favorable for further enhancing the aligning precision with the optical axis and suppressing the stray light of the imaging lens module 1000 simultaneously.

The coating area 131 includes an annular groove structure 135 having a rough surface 133. The surface roughness of the rough surface 133 coated with the light absorbing coating 161 is Ra, which is satisfied: 0.1 μm<Ra. The light absorbing coating 161 is coated by a needle. The isolation area 141 is a smooth surface.

In FIG. 1A, a light blocking sheet 1201 is disposed between the object-side surface 101 with the light absorbing coating 161 and the lens element 1101 adjacent to the object-side surface 101, and abutted with the isolation area 141 of the object-side surface 101.

In FIG. 1B, the second fitting portion 151 includes an inclined surface 153. When an angle between the inclined surface 153 and the optical axis of the imaging lens module 1000 is θ2, the following condition is satisfied: 0 degrees<θ2<35 degrees. Therefore, it is favorable for the plastic lens element 100 to further maintain the aligning precision with the optical axis.

The data of the aforementioned parameters of the imaging lens module 1000 according to the 1st embodiment of the present disclosure are listed in the following Table 1, wherein the parameters are also shown as FIG. 1B.

TABLE 1

| 1st Embodiment | | | |
|---|---|---|---|
| N | 4 | θ1 (deg.) | 30 |
| Ra (μm) | 0.32~0.80 | θ2 (deg.) | 10 |
| V | 23.3 | | |

2nd Embodiment

Figure 2A:
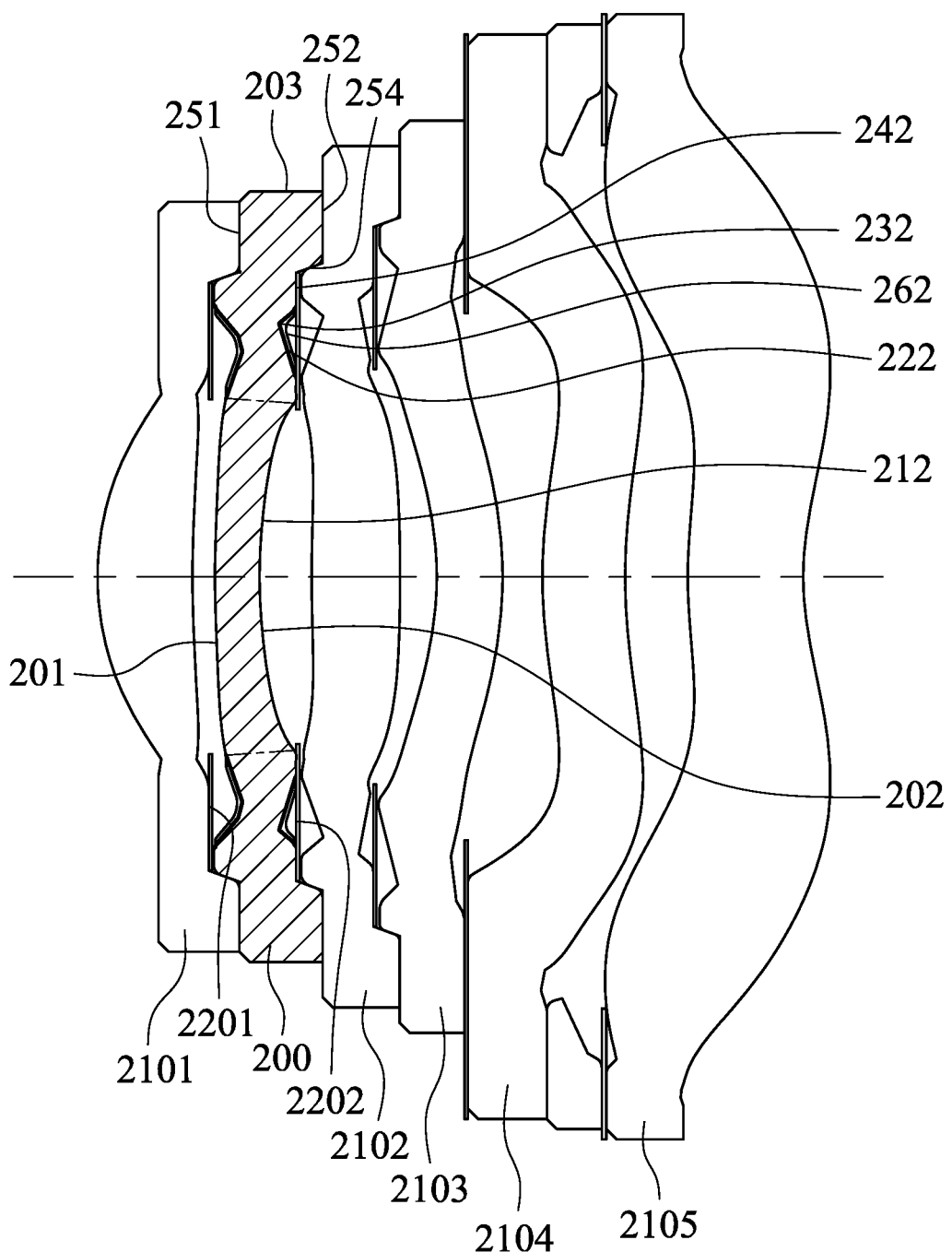
FIG. 2A is a schematic view of an imaging lens module according to the 2nd embodiment of the present disclosure.

FIG. 2A is a schematic view of an imaging lens module 2000 according to the 2nd embodiment of the present disclosure. In FIG. 2A, the imaging lens module 2000 includes a plurality of lens elements, wherein one of the lens elements is a plastic lens element 200. At least one surface of an object-side surface 201 and an image-side surface 202 of the plastic lens element 200 (the aforementioned surface is the image-side surface 202 in the 2nd embodiment) includes an effective optical portion 212, a first fitting portion 252 and a connecting portion 222.

Figure 2B:
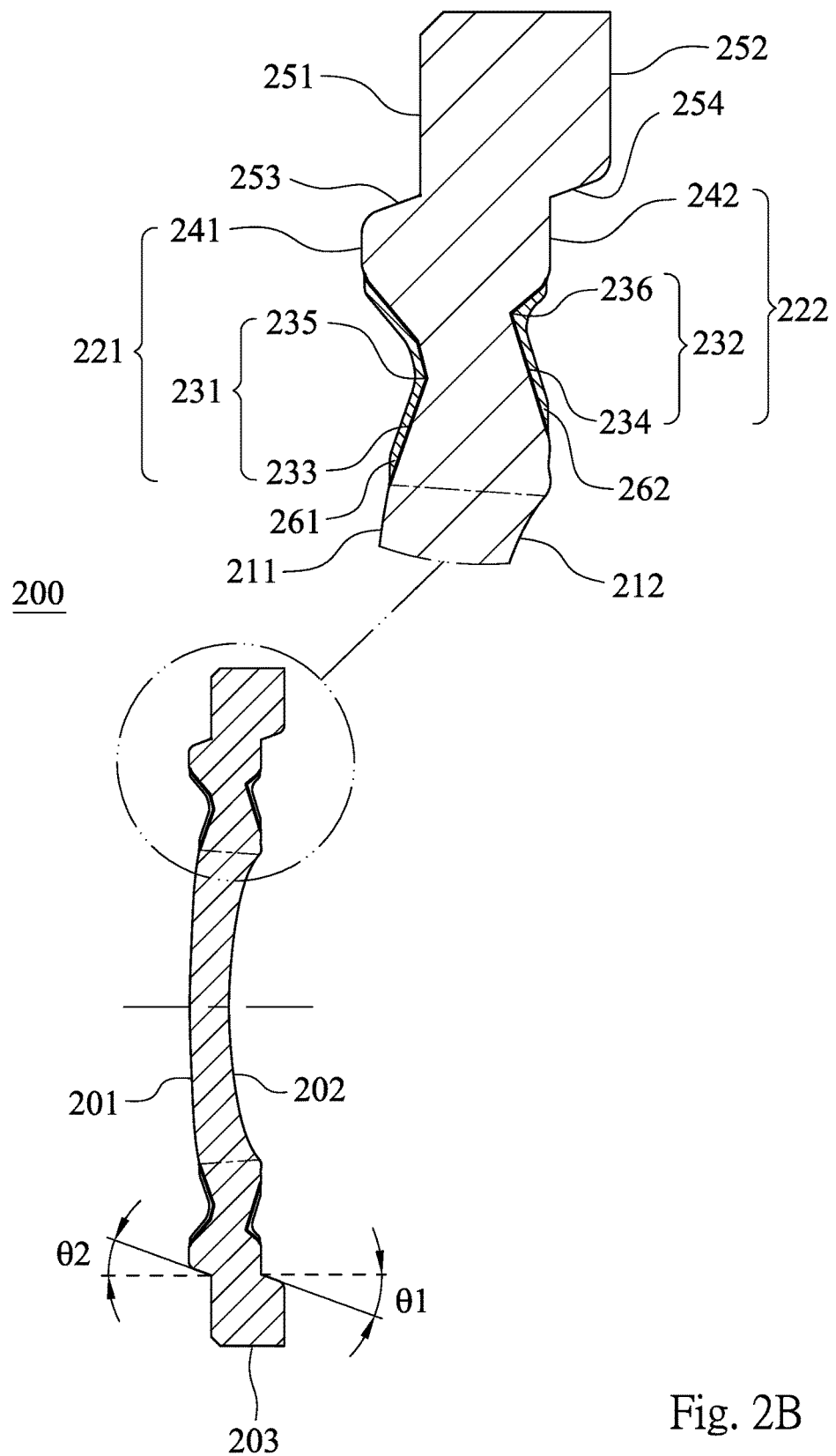
FIG. 2B is a schematic view of the plastic lens element according to the 2nd embodiment.

FIG. 2B is a schematic view of the plastic lens element 200 according to the 2nd embodiment. In FIG. 2A and FIG. 2B, the effective optical portion 212 is aspheric. The first fitting portion 252 surrounds the effective optical portion 212 and is directly connected to a lens element 2102 adjacent to the image-side surface 202, so that the plastic lens element 200 can be aligned with the lens element 2102. That is, the plastic lens element 200 and the lens element 2102 can be aligned with an optical axis of the imaging lens module 2000. The connecting portion 222 connects the effective optical portion 212 and the first fitting portion 252, and includes a coating area 232 and an isolation area 242. The coating area 232 is coated with a light absorbing coating 262. The isolation area 242 isolates the coating area 232 from the first fitting portion 252. In addition, the plastic lens element 200 further includes an outer annular portion 203 connecting the object-side surface 201 and the image-side surface 202.

In FIG. 2A, the imaging lens module 2000 includes, in order from an object side to an image side, a lens element 2101, the plastic lens element 200, the lens element 2102, a lens element 2103, 2104 and 2105. The imaging lens module 2000 has a total of six lens elements. The plastic lens element 200 is the second lens element of the imaging lens module 2000 in order from the object side to the image side.

In FIG. 2B, the plastic lens element 200 has negative refractive power. The object-side surface 201 has an effective optical portion 211 being convex, and the image-side surface 202 has the effective optical portion 212 being concave. The curvature of the effective optical portion 212 is stronger than the curvature of the effective optical portion 211. Furthermore, the plastic lens element 200 is made of a PE material, which is OKP series of OGC (Osaka Gas Chemicals).

The coating area 232 includes an annular groove structure 236 having a rough surface 234. The rough surface 234 is coated with the light absorbing coating 262. The light absorbing coating 262 of the coating area 232 is made of a black resin material and coated by a needle. Furthermore, the isolation area 242 is a smooth surface.

Figure 2C:
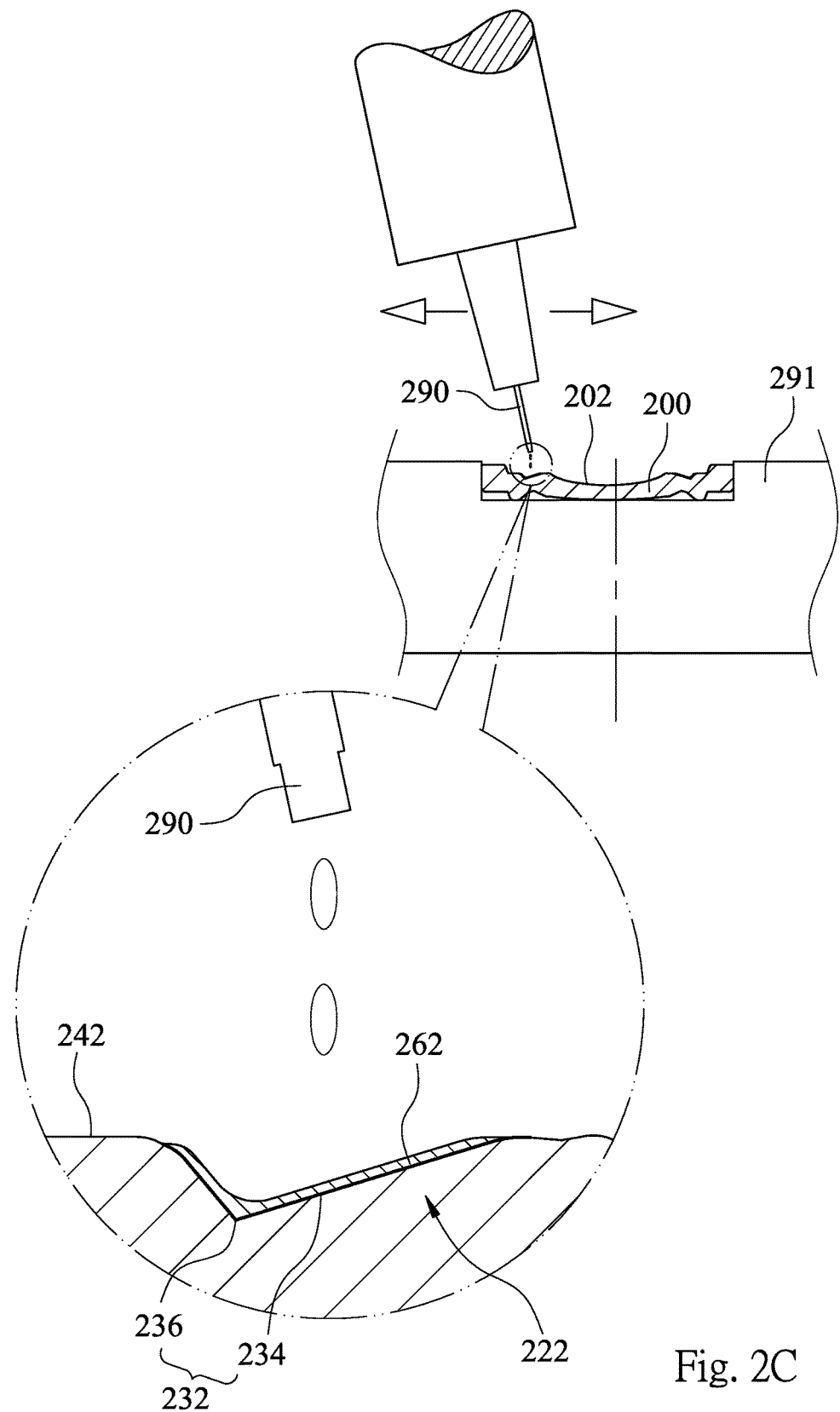
FIG. 2C is a schematic view of the light absorbing coating coated by the needle according to the 2nd embodiment.

FIG. 2C is a schematic view of the light absorbing coating 262 coated by a needle 290 according to the 2nd embodiment. In FIG. 2C, the steps of the light absorbing coating 262 coated by the needle 290 include placing the plastic lens element 200 with the image-side surface 202 upwards on a lens element platform 291, and placing the needle 290 above the coating area 232 of the plastic lens element 200. The coating range of the light absorbing coating 262 is controlled by relatively moving between the lens element platform 291 and the needle 290.

In FIG. 2A, the imaging lens module 2000 further includes a light blocking sheet 2202, which is disposed between the image-side surface 202 of the plastic lens element 200 and the lens element 2102 adjacent to the image-side surface 202. The light blocking sheet 2202 is abutted with the isolation area 242 of the image-side surface 202.

In FIG. 2A and FIG. 2B, the first fitting portion 252 includes an inclined surface 254. The other surface of the plastic lens element 200 (that is the object-side surface 201) includes a second fitting portion 251 connected to the lens element 2101 adjacent to the object-side surface 201.

In FIG. 2B, the object-side surface 201 of the plastic lens element 200 includes the effective optical portion 211, the second fitting portion 251 and a connecting portion 221. The effective optical portion 211 is aspheric. The second fitting portion 251 surrounds the effective optical portion 211 and is directly connected to the lens element 2101 adjacent to the object-side surface 201. The connecting portion 221 connects the effective optical portion 211 and the second fitting portion 251, and includes a coating area 231 and an isolation area 241. The coating area 231 is coated with a light absorbing coating 261. The isolation area 241 isolates the coating area 231 from the second fitting portion 251. The second fitting portion 251 includes an inclined surface 253.

The coating area 231 includes an annular groove structure 235 having a rough surface 233. The rough surface 233 is coated with the light absorbing coating 261. The light absorbing coating 261 is coated by a needle. The isolation area 241 is a smooth surface.

In FIG. 2A, a light blocking sheet 2201 is disposed between the object-side surface 201 with the light absorbing coating 261 and the lens element 2101 adjacent to the object-side surface 201, and abutted with the isolation area 241 of the object-side surface 201.

The data of the parameters N, Ra, V, θ1 and θ2 of the imaging lens module 2000 according to the 2nd embodiment of the present disclosure are listed in the following Table 2, wherein the parameters are also shown as FIG. 2B. The definitions of these parameters shown in Table 2 are the same as those stated in the 1st embodiment with corresponding values for the 2nd embodiment.

TABLE 2

| 2nd Embodiment | | | |
|---|---|---|---|
| N | 6 | θ1 (deg.) | 20 |
| Ra (μm) | 0.56~1.60 | θ2 (deg.) | 20 |
| V | 21.4 | | |

3rd Embodiment

Figure 3A:
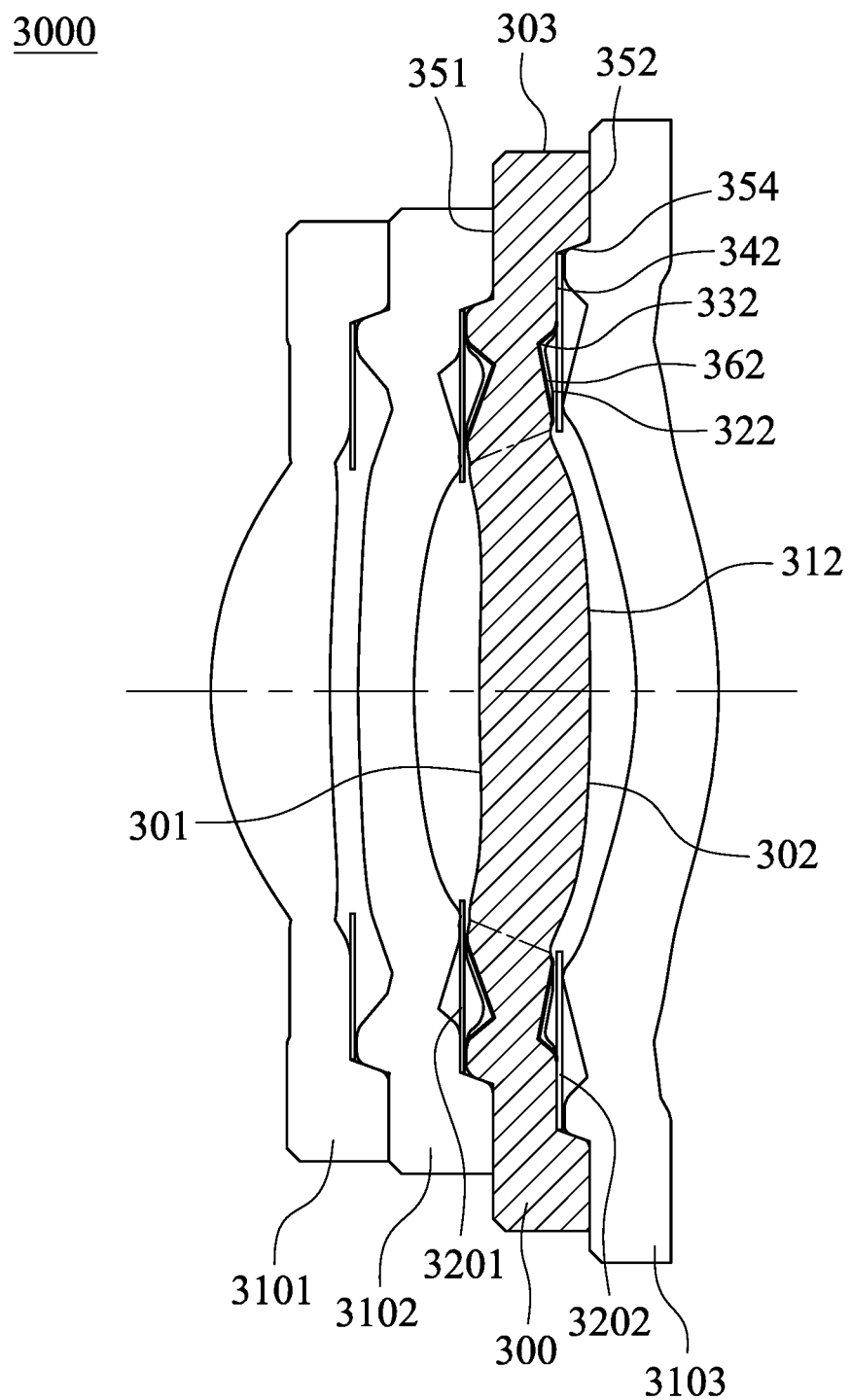
FIG. 3A is a schematic view of an imaging lens module according to the 3rd embodiment of the present disclosure.

FIG. 3A is a schematic view of an imaging lens module 3000 according to the 3rd embodiment of the present disclosure. In FIG. 3A, the imaging lens module 3000 includes a plurality of lens elements, wherein one of the lens elements is a plastic lens element 300. At least one surface of an object-side surface 301 and an image-side surface 302 of the plastic lens element 300 (the aforementioned surface is the image-side surface 302 in the 3rd embodiment) includes an effective optical portion 312, a first fitting portion 352 and a connecting portion 322.

Figure 3B:
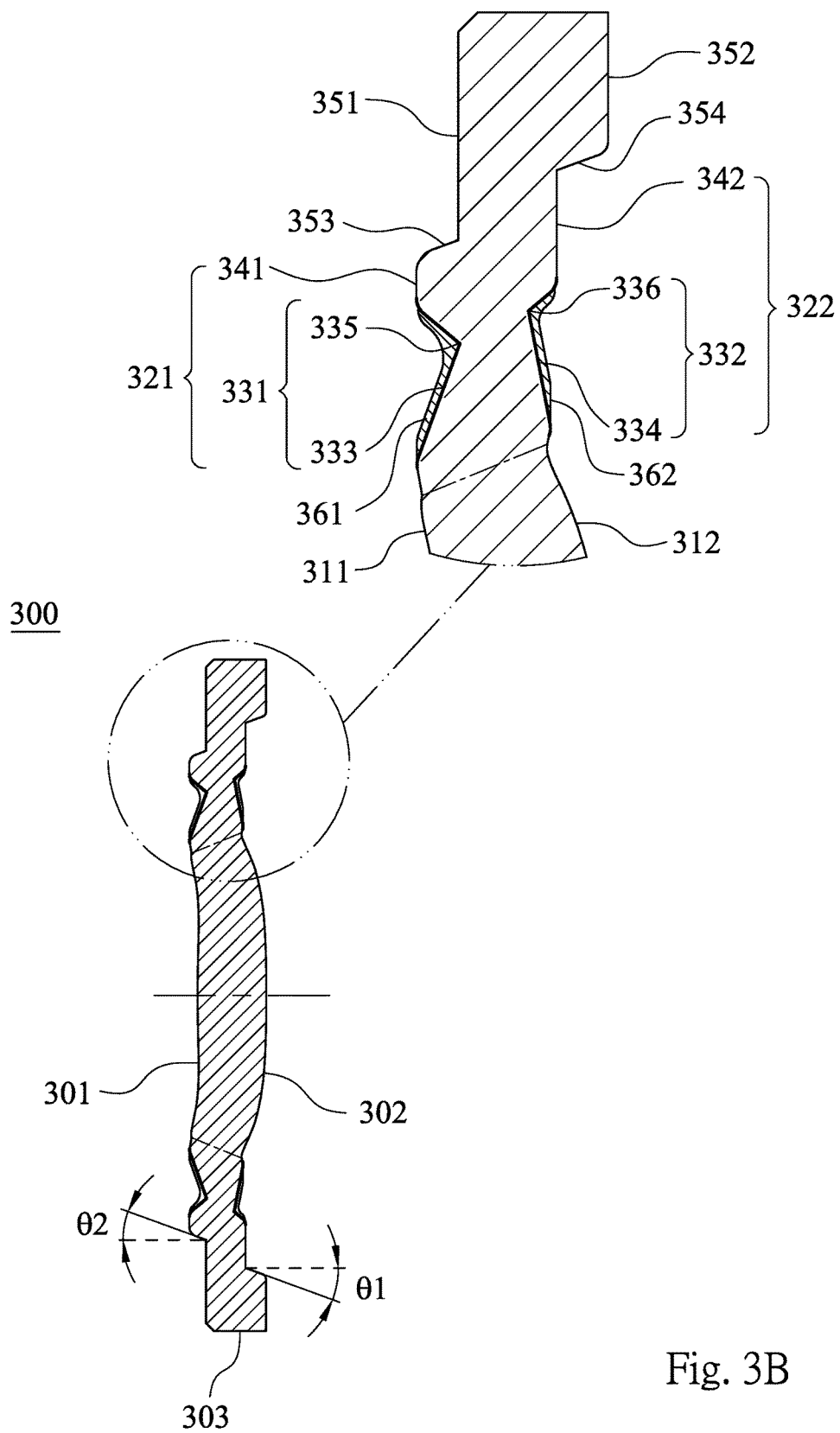
FIG. 3B is a schematic view of the plastic lens element according to the 3rd embodiment.

FIG. 3B is a schematic view of the plastic lens element 300 according to the 3rd embodiment. In FIG. 3A and FIG. 3B, the effective optical portion 312 is aspheric. The first fitting portion 352 surrounds the effective optical portion 312 and is directly connected to a lens element 3103 adjacent to the image-side surface 302, so that the plastic lens element 300 can be aligned with the lens element 3103. That is, the plastic lens element 300 and the lens element 3103 can be aligned with an optical axis of the imaging lens module 3000. The connecting portion 322 connects the effective optical portion 312 and the first fitting portion 352, and includes a coating area 332 and an isolation area 342. The coating area 332 is coated with a light absorbing coating 362. The isolation area 342 isolates the coating area 332 from the first fitting portion 352. In addition, the plastic lens element 300 further includes an outer annular portion 303 connecting the object-side surface 301 and the image-side surface 302.

In FIG. 3A, the imaging lens module 3000 includes, in order from an object side to an image side, a lens element 3101, 3102, the plastic lens element 300 and the lens element 3103. The imaging lens module 3000 has a total of four lens elements. The plastic lens element 300 is the third lens element of the imaging lens module 3000 in order from the object side to the image side.

In FIG. 3B, the plastic lens element 300 has positive refractive power. Both of an effective optical portion 311 of the object-side surface 301 and the effective optical portion 312 of the image-side surface 302 are convex. In particular optical designs of the lens elements of the imaging lens module 3000, the plastic lens element 300 can have an effect of negative refractive power so as to correct aberrations. Furthermore, the plastic lens element 300 is made of a PC material with a high refractive index, which is EP series of MGC (Mitsubishi Gas Chemicals).

The coating area 332 includes an annular groove structure 336 having a rough surface 334. The rough surface 334 is coated with the light absorbing coating 362. The light absorbing coating 362 of the coating area 332 is made of a black resin material and coated by a needle. Furthermore, the isolation area 342 is a smooth surface.

Figure 3C:
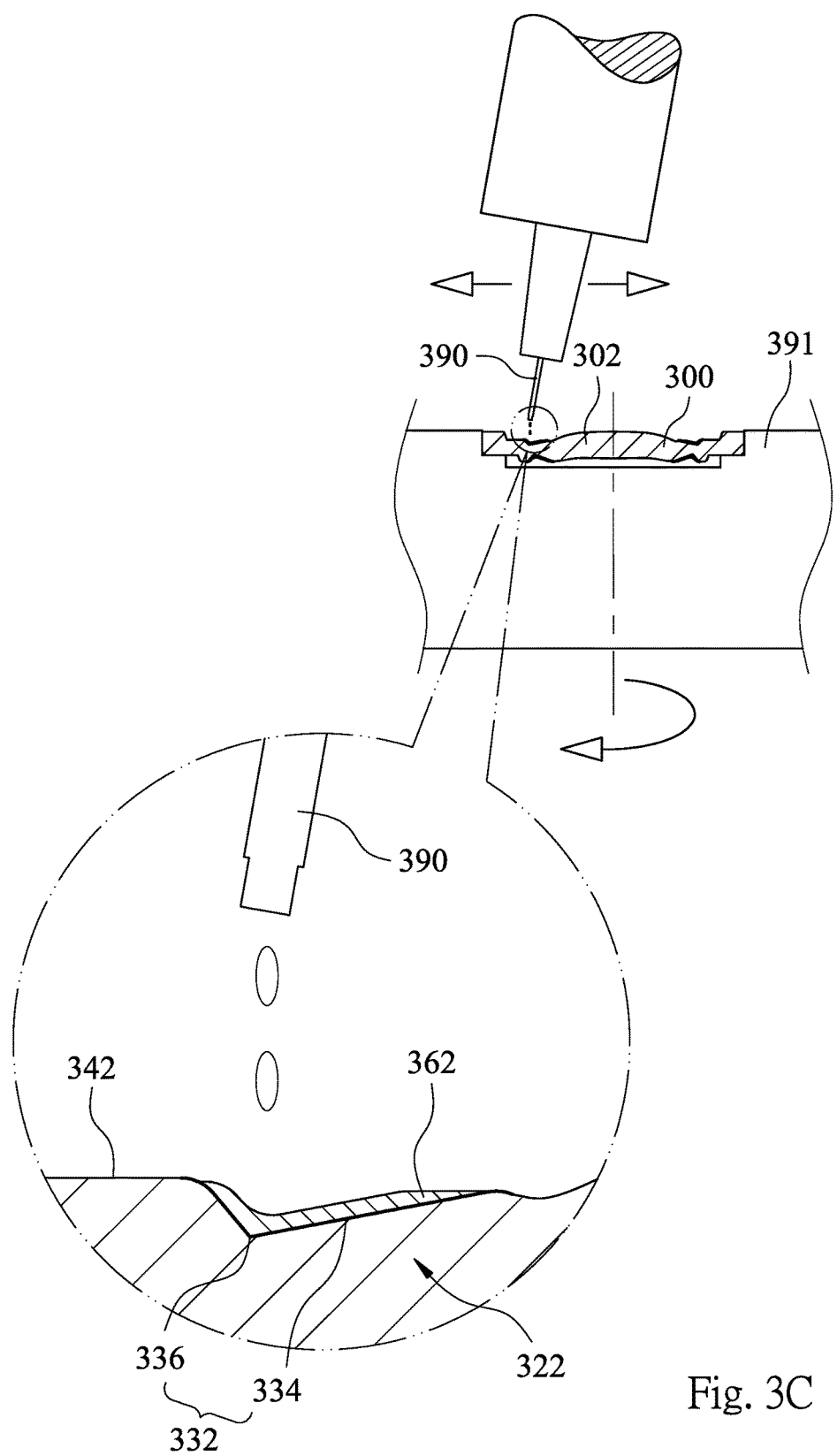
FIG. 3C is a schematic view of the light absorbing coating coated by the needle according to the 3rd embodiment.

FIG. 3C is a schematic view of the light absorbing coating 362 coated by a needle 390 according to the 3rd embodiment. In FIG. 3C, the steps of the light absorbing coating 362 coated by the needle 390 include placing the plastic lens element 300 with the image-side surface 302 upwards on a lens element platform 391, and placing the needle 390 above the coating area 332 of the plastic lens element 300. The coating range of the light absorbing coating 362 is controlled by relatively rotating and moving between the lens element platform 391 and the needle 390.

In FIG. 3A, the imaging lens module 3000 further includes a light blocking sheet 3202, which is disposed between the image-side surface 302 of the plastic lens element 300 and the lens element 3103 adjacent to the image-side surface 302. The light blocking sheet 3202 is abutted with the isolation area 342 of the image-side surface 302.

In FIG. 3A and FIG. 3B, the first fitting portion 352 includes an inclined surface 354. The other surface of the plastic lens element 300 (that is the object-side surface 301) includes a second fitting portion 351 connected to the lens element 3102 adjacent to the object-side surface 301.

In FIG. 3B, the object-side surface 301 of the plastic lens element 300 includes the effective optical portion 311, the second fitting portion 351 and a connecting portion 321. The effective optical portion 311 is aspheric. The second fitting portion 351 surrounds the effective optical portion 311 and is directly connected to with the lens element 3102 adjacent to the object-side surface 301. The connecting portion 321 connects the effective optical portion 311 and the second fitting portion 351, and includes a coating area 331 and an isolation area 341. The coating area 331 is coated with a light absorbing coating 361. The isolation area 341 isolates the coating area 331 from the second fitting portion 351. The second fitting portion 351 includes an inclined surface 353.

The coating area 331 includes an annular groove structure 335 having a rough surface 333. The rough surface 333 is coated with the light absorbing coating 361. The light absorbing coating 361 is coated by a needle. The isolation area 341 is a smooth surface.

In FIG. 3A, a light blocking sheet 3201 is disposed between the object-side surface 301 with the light absorbing coating 361 and the lens element 3102 adjacent to the object-side surface 301, and abutted with the isolation area 341 of the object-side surface 301.

The data of the parameters N, Ra, V, θ1 and θ2 of the imaging lens module 3000 according to the 3rd embodiment of the present disclosure are listed in the following Table 3, wherein the parameters are also shown as FIG. 3B. The definitions of these parameters shown in Table 3 are the same as those stated in the 1st embodiment with corresponding values for the 3rd embodiment.

TABLE 3

| 3rd Embodiment | | | |
|---|---|---|---|
| N | 4 | θ1 (deg.) | 20 |
| Ra (µm) | 0.80~2.24 | θ2 (deg.) | 20 |
| V | 20.4 | | |

4th Embodiment

Figure 4:
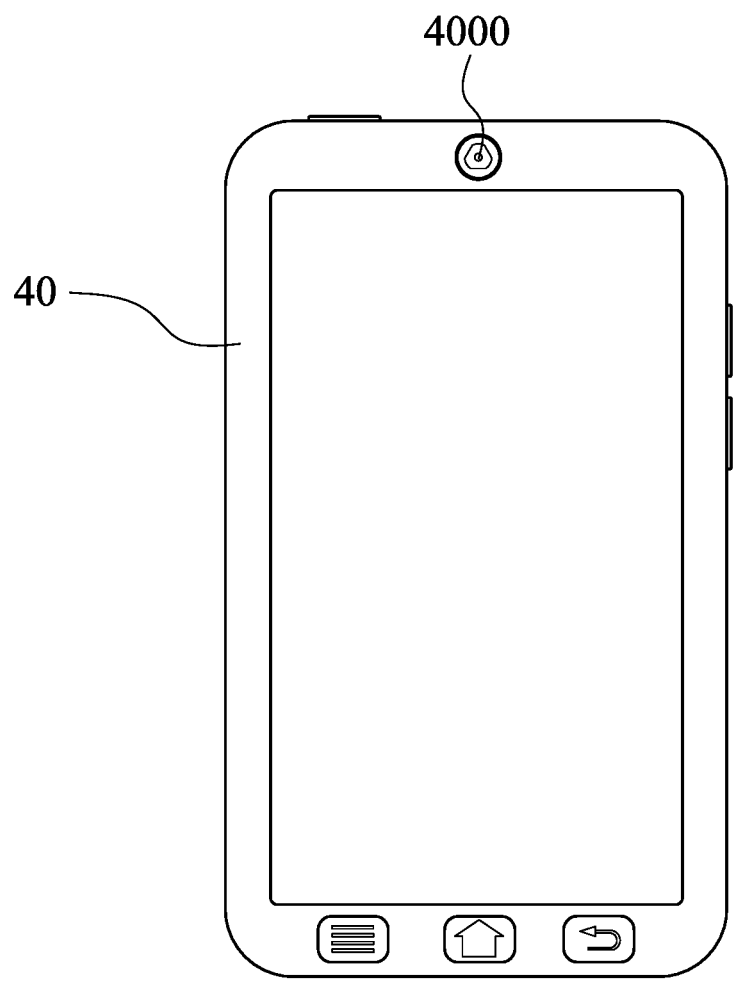
FIG. 4 shows an electronic device according to the 4th embodiment of the present disclosure.

FIG. 4 shows an electronic device 40 according to the 4th embodiment of the present disclosure. The electronic device 40 of the 4th embodiment is a smart phone, wherein the electronic device 40 includes an imaging lens module 4000 according to the present disclosure. Therefore, it is favorable for enhancing the aligning precision with the optical axis and suppressing the stray light of the imaging lens module 4000 simultaneously so as to improve the image quality and satisfy the requirements of high-end electronic devices with camera functionalities. Furthermore, the electronic device 40 can further include an image sensor (not shown herein) disposed on or near an image surface of the lens module 4000. Preferably, the electronic device 40 can further include but not limited to a display, a control unit, a storage unit, a random access memory unit (RAM), a read-only memory unit (ROM) or a combination thereof.

5th Embodiment

Figure 5:
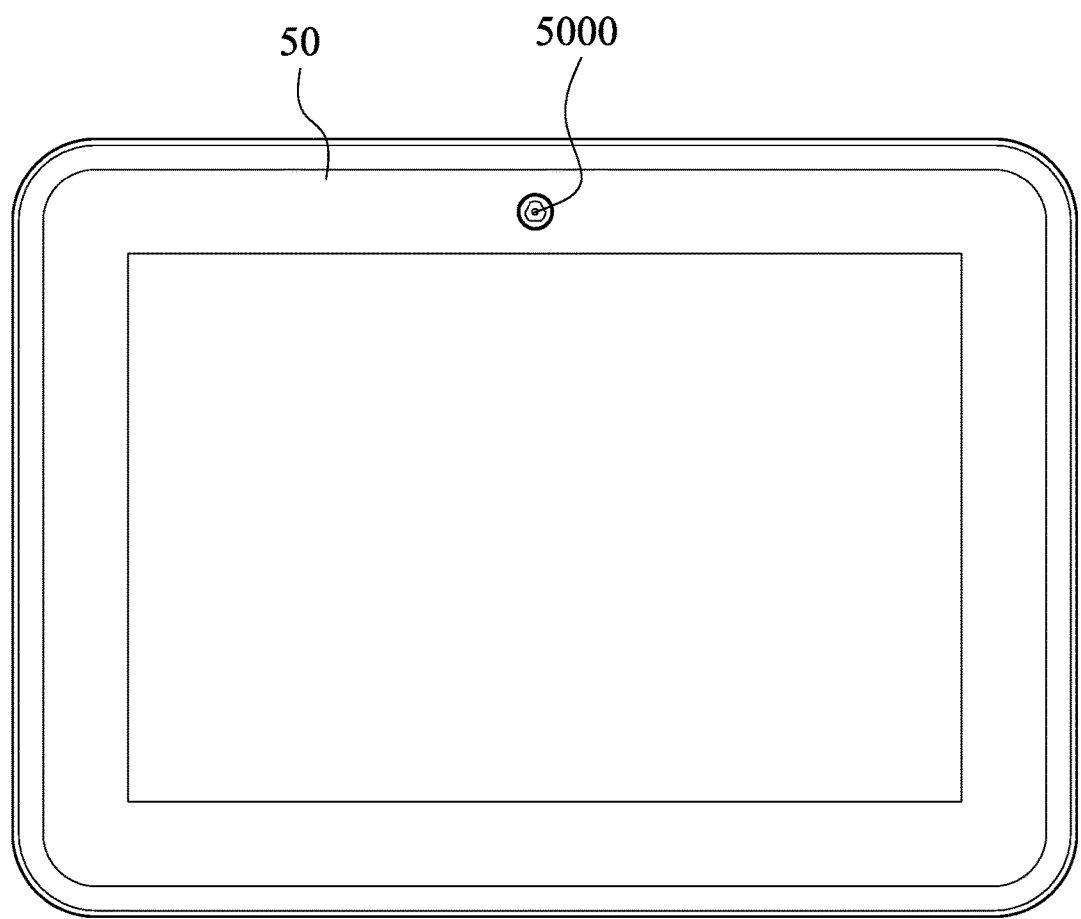
FIG. 5 shows an electronic device according to the 5th embodiment of the present disclosure.

FIG. 5 shows an electronic device 50 according to the 5th embodiment of the present disclosure. The electronic device 50 of the 5th embodiment is a tablet personal computer, wherein the electronic device 50 includes an imaging lens module 5000 according to the present disclosure.

6th Embodiment

Figure 6:
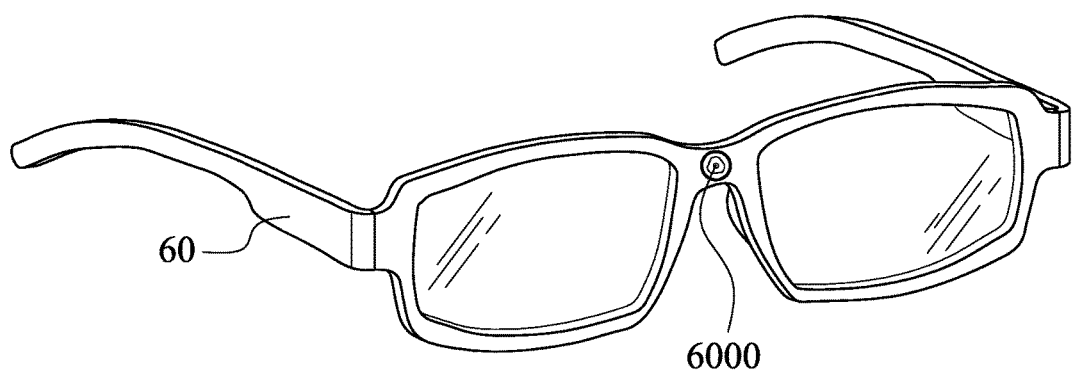
FIG. 6 shows an electronic device according to the 6th embodiment of the present disclosure.

FIG. 6 shows an electronic device 60 according to the 6th embodiment of the present disclosure. The electronic device 60 of the 6th embodiment is a wearable device, wherein the electronic device 60 includes an imaging lens module 6000 according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An imaging lens module, comprising a plurality of lens elements, wherein one of the lens elements is a plastic lens element, and at least one surface of an object-side surface and an image-side surface of the plastic lens element comprises:
   an effective optical portion being aspheric;
   a first fitting portion surrounding the effective optical portion and connected to another one of the lens elements adjacent to the surface for aligning the plastic lens element with the lens element adjacent to the surface; and
   a connecting portion connecting the effective optical portion and the first fitting portion, and comprising:
      a coating area comprising a rough surface coated with a light absorbing coating;
      an isolation area isolating the coating area from the first fitting portion, wherein a surface roughness of the isolation area being smooth surface is smaller than a surface roughness of the rough surface of the coating area; and
   at least one light blocking sheet disposed between the surface of the plastic lens element and the lens element adjacent to the surface thereof, or between the other surface of the plastic lens element and another one of the lens elements adjacent to the other surface thereof;
   wherein the effective optical portion, the first fitting portion and the connecting portion comprising the coating area and the isolation area are all located on the same surface of the plastic lens element;
   wherein a number of the lens elements of the imaging lens module is N, and the following condition is satisfied:
   N>3.

2. The imaging lens module of claim 1, wherein the coating area comprises an annular groove structure coated with the light absorbing coating.

3. The imaging lens module of claim 1, wherein the light blocking sheet is disposed between the surface of the plastic lens element and the lens element adjacent to the surface thereof.

4. The imaging lens module of claim 1, wherein the light blocking sheet is abutted with the isolation area of the surface of the plastic lens element, or abutted with the other surface of the plastic lens element.

5. The imaging lens module of claim 1, wherein the other surface of the object-side surface and the image-side surface of the plastic lens element comprises:
a second fitting portion connected to another one of the lens elements adjacent to the other surface of the plastic lens element.

6. The imaging lens module of claim 1, wherein the plastic lens element is the second lens element of the imaging lens module in order from an object side to an image side.

7. The imaging lens module of claim 1, wherein the plastic lens element is the third lens element of the imaging lens module in order from an object side to an image side.

8. The imaging lens module of claim 1, wherein the plastic lens element has negative refractive power.

9. The imaging lens module of claim 1, wherein an Abbe number of the plastic lens element is V, and the following condition is satisfied:
V<25.

10. The imaging lens module of claim 1, wherein an Abbe number of the plastic lens element is V, and the following condition is satisfied:
V<22.

11. The imaging lens module of claim 1, wherein the surface roughness of the rough surface of the coating area is Ra, and the following condition is satisfied:
0.1 μm<Ra.

12. The imaging lens module of claim 1, wherein the light absorbing coating is coated by a needle.

13. The imaging lens module of claim 1, wherein the first fitting portion comprises:
an inclined surface, wherein an angle between the inclined surface and an optical axis of the imaging lens module is θ1, and the following condition is satisfied:
0 degrees<θ1<35 degrees.

14. The imaging lens module of claim 1, wherein the light absorbing coating is made of a black resin material.

15. The imaging lens module of claim 1, wherein the number of the lens elements of the imaging lens module is N, and the following condition is satisfied:
N>4.

16. An electronic device, comprising:
the imaging lens module of claim 1.

* * * * *

UNITED STATES PATENT AND TRADEMARK OFFICE
CERTIFICATE OF CORRECTION

PATENT NO. : 9,952,359 B2  
APPLICATION NO. : 15/051764  
DATED : April 24, 2018  
INVENTOR(S) : Chang Page 1 of 1

It is certified that error appears in the above-identified patent and that said Letters Patent is hereby corrected as shown below:

In the Claims

Column 10, Line 39, at the end of the line, add --and--

Column 10, Line 44, delete "and"

Column 10, Lines 45-49, delete "at least one light blocking sheet disposed between the surface of the plastic lens element and the lens element adjacent to the surface thereof, or between the other surface of the plastic lens element and another one of the lens elements adjacent to the other surface thereof;"

Column 10, Line 56, at the end of the line, delete the period "." and insert therefor: --; and--

Column 10, immediately following Line 56 insert: --wherein the imaging lens module further comprises at least one light blocking sheet disposed between the surface of the plastic lens element and the lens element adjacent to the surface thereof, or between the other surface of the plastic lens element and another one of the lens elements adjacent to the other surface thereof.--

Signed and Sealed this  
Fifth Day of May, 2020

Andrei Iancu  
*Director of the United States Patent and Trademark Office*